United States Patent [19]

Okuzumi

[11] Patent Number: 5,103,947
[45] Date of Patent: Apr. 14, 1992

[54] HYDRAULIC TORQUE TRANSMITTING DEVICE WITH LOCK-UP CLUTCH

[75] Inventor: Hiroshi Okuzumi, Kanagawa, Japan

[73] Assignee: Nissan Motor Co., Ltd., Yokohama, Japan

[21] Appl. No.: 711,943

[22] Filed: Jun. 7, 1991

[30] Foreign Application Priority Data

Jun. 13, 1990 [JP] Japan .................. 2-154951

[51] Int. Cl.$^5$ .............................................. F16D 33/06
[52] U.S. Cl. .................... 192/3.25; 192/3.27
[58] Field of Search ............... 192/3.25, 3.27, 3.29, 192/53 A, 53 F

[56] References Cited

U.S. PATENT DOCUMENTS

| | | | |
|---|---|---|---|
| 2,130,895 | 9/1938 | Ness | 192/3.26 |
| 2,512,853 | 6/1950 | Eaton | 192/3.21 X |
| 2,584,032 | 1/1952 | Lapsley | 192/3.3 X |
| 2,652,730 | 9/1953 | Newcomb | 192/3.3 X |
| 3,247,936 | 4/1966 | Aschauer | 192/3.27 |
| 3,438,470 | 4/1969 | Kaptur | 192/3.33 |
| 3,473,411 | 10/1969 | Paredes | 192/3.33 |
| 4,648,492 | 3/1987 | Moore | 192/3.21 |

Primary Examiner—Leslie A. Braun
Assistant Examiner—Nicholas Whitelaw
Attorney, Agent, or Firm—Foley & Lardner

[57] ABSTRACT

In a lock-up torque converter, first and second input shells are rotatable and axially movable relative to each other. The second input shell is integrally provided with a pump impeller. A turbine runner is rotatable but axially fixed relative to an output shaft. A first clutch engages the turbine runner with a lock-up clutch plate during disengagement of the lock-up clutch plate from the first input shell and disengages the turbine runner from the lock-up clutch plate during engagement of the lock-up clutch plate with the first input shell. A second clutch engages the first and second input shells while allowing them to be axially movable relative to each other during disengagement of the lock-up clutch plate from the first input shell and disengages the first and second input shells during engagement of the lock-up clutch plate with the first input shell.

9 Claims, 4 Drawing Sheets

HYDRAULIC TORQUE TRANSMITTING DEVICE WITH LOCK-UP CLUTCH

BACKGROUND OF THE INVENTION

1. Field of the Invention

The present invention relates to a hydraulic torque transmitting device, such as a fluid coupling or a torque converter, for use in an automatic transmission for an automobile, etc. and particularly of the type provided with a lock-up clutch.

2. Description of the Prior Art

A prior art lock-up torque converter has a pump impeller integrally connected to an input shell, a turbine runner disposed in toroidal fluid flow relation to the pump impeller and splined or otherwise attached to an output shaft for rotation therewith, and a lock-up clutch for providing a direct mechanical drive between the input shell and the output shaft.

With the prior art structure, the pump impeller and turbine runner, which have a relatively large inertia, are essentially driven to rotate together with the input shell and the output shaft during engagement of the lock-up clutch. Due to this, in the case of engagement of the lock-up clutch, a booming sound or like noise is caused by the rotation of the pump impeller and turbine runner, resulting in noisy operation of the torque converter. Further, rotation of the pump impeller inevitably causes the working oil within the converter to be stirred, resulting in a loss of energy and, therefore, a deteriorated power transmitting efficiency.

SUMMARY OF THE INVENTION

In accordance with the present invention, there is provided a hydraulic torque transmitting device which comprises first and second input shells rotatable and axially movable relative to each other and having mating end portions, a pump impeller integrally connected to the second input shell, an output shaft, a turbine runner in toroidal fluid flow relation with the pump impeller and rotatable but axially fixed relative to the output shaft, a lock-up clutch plate disposed between the first input shell and the turbine runner and axially movable relative to the output shaft for engagement with and disengagement from the input shell, the lock-up clutch plate being rotationally fixed relative to the output shaft so that during engagement with the first input shell it directly drivingly connects the first input shell to the output shaft, first clutch means for engaging the lock-up clutch plate with the turbine runner during disengagement of the lock-up clutch plate from the first input shell, and second clutch means disposed between the mating end portions of the input shells and the lock-up clutch plate for engaging the input shells while allowing rotation of the input shells relative to the lock-up clutch plate during disengagement of the lock-up clutch plate from the first input shell and disengaging the input shells during engagement of the lock-up clutch plate with the first input shell.

This structure can solve the above noted problems inherent in the prior art device.

It is accordingly an object of the present invention to provide a novel and improved hydraulic torque transmitting device which is quiet in operation while being capable of attaining a considerably improved torque transmitting efficiency.

It is a further object of the present invention to provide a novel and improved torque transmitting device which is durable and dependable.

DETAILED DESCRIPTION OF THE PREFERRED EMBODIMENT

Figure 1:
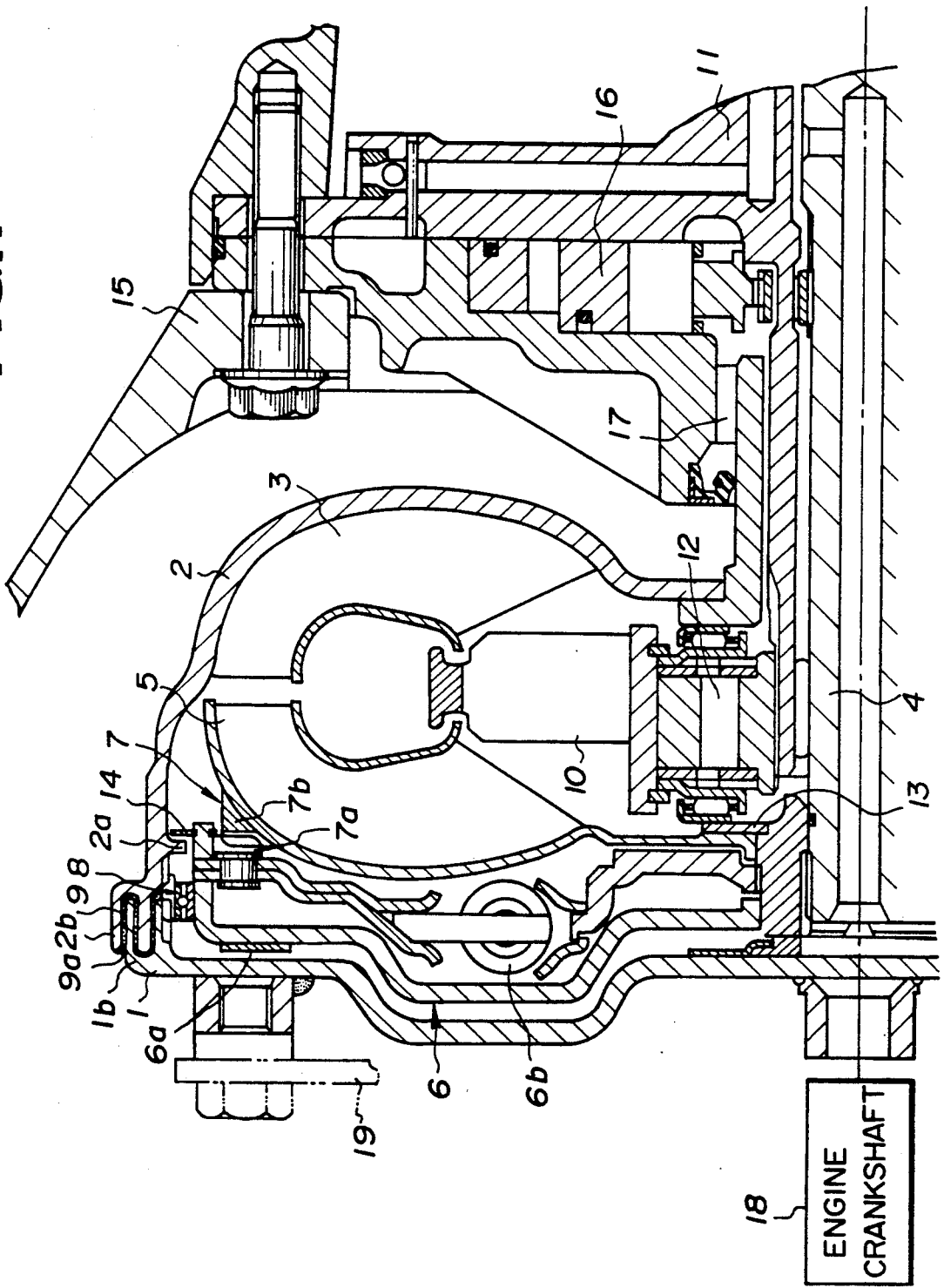
FIG. 1 is a fragmentary sectional view of a lock-up torque converter according to an embodiment of the present invention.

Referring now to FIG. 1, a lock-up torque converter is shown as comprising a first converter cover (first input shell) 1 connected to an engine crankshaft (input shaft) 18 by way of a drive plate 19, a second converter cover (second input shell) 2 connected to a pump impeller 3, a turbine runner 5 disposed in toroidal fluid flow relation to the pump impeller 3 and adapted for rotation but against axial movement relative to a transmission input shaft (output shaft) 4, a lock-up clutch plate 6 disposed between the first converter cover 1 and the turbine runner 5 and adapted for axial movement but against rotation relative to the transmission input shaft 4, a gear clutch (first clutch) 7 disposed between the lock-up clutch plate 6 and the turbine runner 5 and adapted to engage during disengagement of the lock-up clutch plate 6 from the first converter cover 1 and disengage during engagement of the lock-up clutch plate 6 with the first converter cover 1, and a synchromesh gear clutch (second clutch) 8 disposed between mating end portions 1b and 2b of the converter covers 1 and 2 and the lock-up clutch plate 6 and adapted to engage the converter covers 1 and 2 while allowing rotation of the converter covers 1 and 2 relative to the lock-up clutch plate 6 during disengagement of the lock-up clutch plate 6 from the first converter cover 1 and disengage the converter covers 1 and 2 during engagement of lock-up clutch plate 6 with the first converter cover 1.

In the foregoing, it will be understood that the lock-up clutch plate 6 and the first converter cover 1 cooperate with each other to constitute a lock-up clutch.

A labyrinth sliding groove 9 receiving therein a labyrinth seal 9a is formed in the mating end portions 1b and 2b of the first and second converter covers 1 and 2 and applied with grease. A stator 10 is disposed between the pump impeller 3 and the turbine runner 5 and in toroidal fluid flow relation thereto. The stator 10 is installed on a transmission case 11 by way of a one-way clutch 12.

The turbine runner 5 is held axially fixed by means of a positioning plate 13 which is in turn fixed to the transmission input shaft 4.

The lock-up clutch plate 6 is provided with a facing 6a and a torsion spring 6b for absorbing a torque variation in the case of engagement and disengagement of the lock-up clutch plate 6 with and from the first converter cover 1. Further, provided on the outer peripheral portion of the lock-up clutch plate 6 is a lead seal 14 for contact with an inward projection 2a of the second converter cover 2 during engagement of the lock-up clutch 6.

Figure 2:
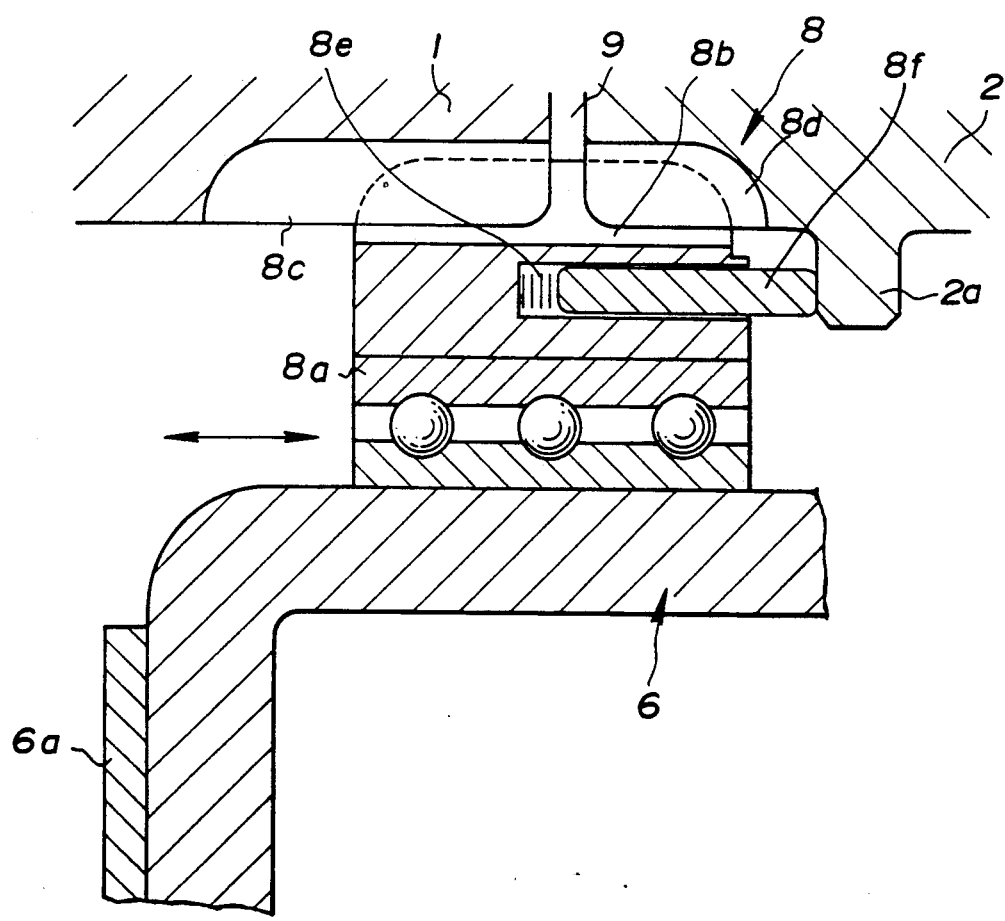
FIG. 2 is an enlarged sectional view of a novel important portion of the lock-up torque converter of FIG. 1.

The synchromesh gear clutch 8, as shown in FIG. 2, consists of a lock-up clutch plate side gear 8b attached to the outer peripheral surface of the lock-up clutch plate 6 by way of a bearing 8a, a first converter cover side gear 8c formed in the inner peripheral surface of the first converter cover 1, a second converter cover side gear 8d formed in the inner peripheral surface of the second converter cover 2, and a synchro ring 8f installed on a base portion of the lock-up clutch side gear 8b and adapted to be urged against the inward projection 2a of the second converter cover 2 under the bias of a synchro spring 8e.

In FIG. 1, 15 is a converter housing, 16 is an oil pump, and 17 is a bearing for support of the second converter cover 2.

The operation will be described hereinbelow.

(A) During disengagement of lock-up clutch:

During disengagement of the lock-up clutch plate 6 from the first converter cover 1, the lock-up clutch plate 6 and the turbine runner 5 are engaged by the gear clutch 7. On the other hand, the synchromesh gear clutch 8 engages the first and second converter covers 1 and 2 while allowing rotation of the converter covers 1 and 2 relative to the lock-up clutch plate 6.

Figure 3:
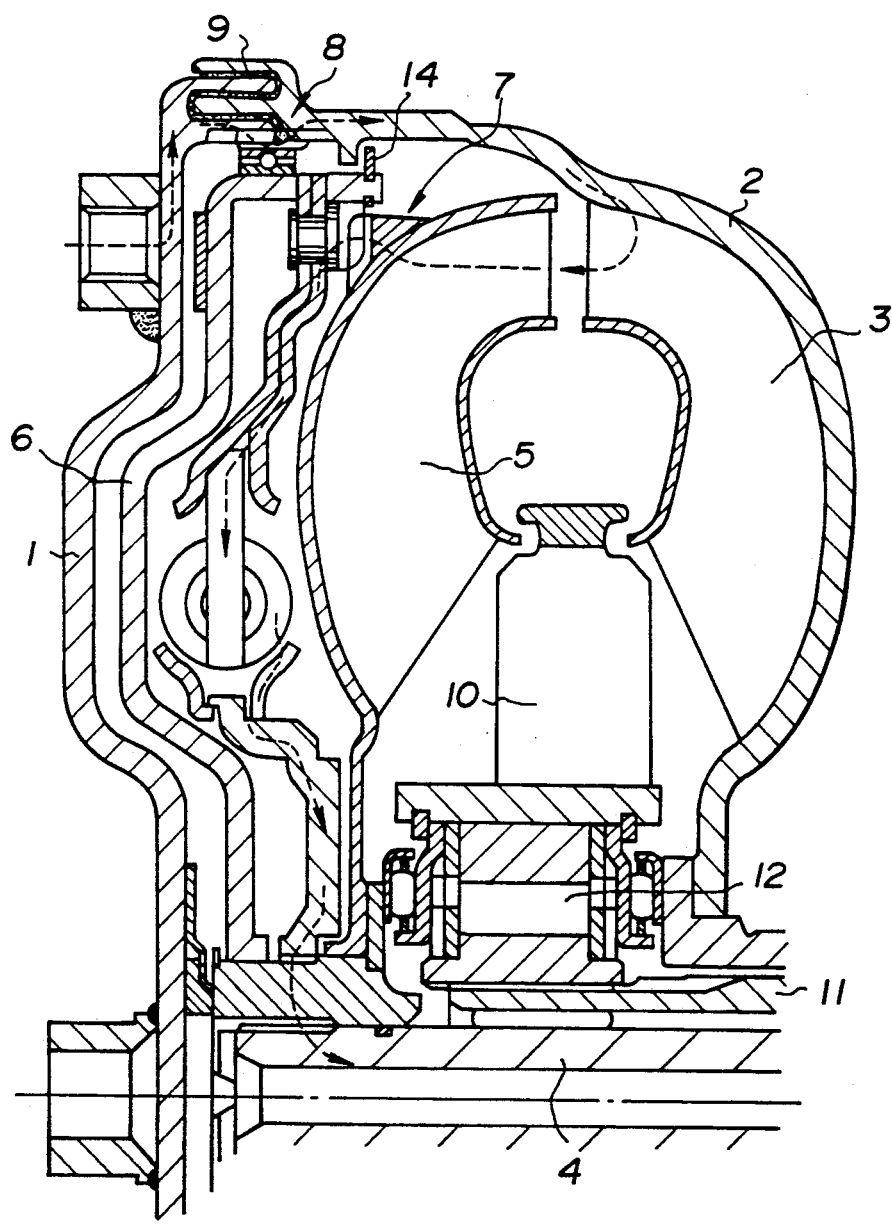
FIG. 3 is a reduced sectional view of the lock-up torque converter of FIG. 1 in its lock-up clutch disengaged state.

Accordingly, torque is transmitted from the engine crankshaft 18, as shown in FIG. 3, through the first converter cover 1, second converter cover 2, pump impeller 3, converter oil, turbine runner 5 and the lock-up clutch plate 6 to the transmission input shaft 4, so that the pump impeller 3 and turbine runner 5 retain a fluid coupling function.

(B) During engagement of lock-up clutch:

During engagement of the lock-up clutch plate 6 with the first converter cover 1, the lock-up piston 6 and the turbine runner 5 are disengaged by the gear clutch 7. On the other hand, the synchromesh gear clutch 8 disengages the first converter cover 1 from the second converter cover 2 having the pump impeller 3.

Figure 4:
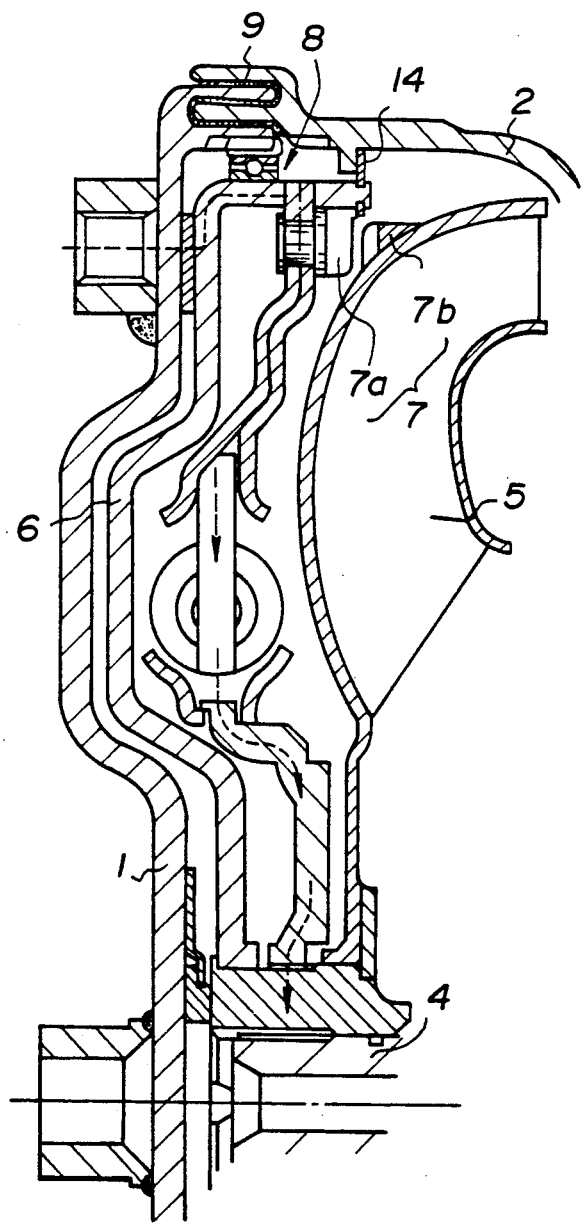
FIG. 4 is a reduced sectional view of the lock-up torque converter of FIG. 1 in its lock-up clutch engaged state.

Accordingly, torque is transmitted from the engine crankshaft, as shown in FIG. 4, through the first converter cover 1 and the lock-up clutch plate 6 to the transmission input shaft 4, such that the pump impeller 3 and turbine runner 5 are drivingly disconnected from the above rotating members and therefore not driven to rotate.

(C) Synchronizing action during engagement of lock-up clutch:

As described above, since the pump impeller 3 and the turbine runner 5 are not driven to rotate during engagement of the lock-up clutch plate 6 from the first converter cover 1, it is necessary to synchronize the rotations of the converter covers 1 and 2 in order to smoothly engage them in the case of disengagement of the lock-up clutch plate 6 from the first converter cover 1.

The operation of the converter in the case of disengagement of the lock-up clutch plate 6 from the first converter cover 1 is described hereinbelow.

When the lock-up clutch plate 6 is disengaged from the first converter cover 1 and moved away from same a predetermined distance, the synchro ring 8f is put into contact with the inward projection 2a of the second converter cover 2 at the halfway point of its movement. Thereafter, by gradually increasing the contact resistance, the rotation of the second converter cover 2 becomes faster and finally is synchronized with the rotation of the first converter cover 1.

Under this synchronized condition, both gears 8b and 8d of the synchromesh gear clutch 8 are engaged without causing any gear noise, thereby smoothly engaging the first and second converter covers 1 and 2.

(D) Sealing operation obtained at the mating end portions of the converter covers:

The labyrinth sliding groove 9 at the mating end portions 1b and 2b of the first and second converter covers 1 and 2 is applied with grease so as to prevent oil leakage.

During disengagement of the lock-up clutch plate 6 from the first converter cover 1, both converter covers 1 and 2 are driven to rotate together, thus allowing the converter oil to be subjected to a large centrifugal force and therefore the oil pressure acting on the inner wall of both converter covers 1 and 2 to increase.

However, as shown in FIG. 2, the labyrinth sliding groove 9 is closed by the synchro ring 8 of the synchromesh gear clutch 8, preventing any leakage of oil from the labyrinth sliding groove 9.

On the other hand, during engagement of the lock-up clutch 6, oil pressure acts on the transmission side of the lock-up clutch plate 6. However, at the halfway point of movement of lock-up clutch plate 6 away from the first converter cover 1 in the case of disengagement of the lock-up clutch, the lead seal 14 is put into contact with the inward projection 2a, thus preventing the labyrinth groove 9 from being acted upon by oil pressure and therefore preventing any oil leakage through the labyrinth sliding groove 9.

In any case, the labyrinth sliding groove 9 is not subjected to a large oil pressure; therefore, it becomes possible to prevent oil leakage by applying grease to the groove 9.

From the foregoing, it will be understood that according to the present invention the pump impeller 3 and the turbine runner 5, which have a relatively large inertia, are disengaged from the rotating elements during engagement of the lock-up clutch plate 6 with the first converter cover 1, whereby it becomes possible to reduce the booming sound and the energy loss due to stirring up the converter oil, thereby considerably improving the power transmission efficiency.

It will be further understood that connection and disconnection of the first and second converter covers 1 and 2 is attained by the synchromesh gear clutch 8 synchronizing the rotation of the second converter cover 2 with the rotation of the first converter cover 1 during disengagement of the lock-up clutch plate 6 from the first converter cover, whereby it becomes possible to engage the converter covers 1 and 2 smoothly and quietly.

It will be further understood that the second converter cover 2 is provided with the inward projection 2a at the inner surface thereof while the lock-up clutch plate 6 is provided with the synchro ring 8f for contact with the inward projection 2a during disengagement of the lock-up clutch plate 6 from the first converter cover 1 and further with the lead seal 14 for contact with the inward projection 2a during engagement of the lock-up clutch plate 6 with the first converter cover 1, whereby it becomes possible to assured no leakage of oil, irrespective of the engagement or disengagement of the lock-up clutch plate 6 with and from the first converter cover 1, by only applying grease to the labyrinth sliding groove 9.

While the present invention has been described and shown as being applied to a lock-up torque converter, this is not limitative but it can be applied to another torque transmitting device such as a fluid coupling which is not equipped with a stator.

What is claimed is:

1. A hydraulic torque transmitting device comprising:
   first and second input shells rotatable and axially movable relative to each other and having mating end portions;
   a pump impeller integrally connected to said second input shell;
   an output shaft;
   a turbine runner in toroidal fluid flow relation with said pump impeller and rotatable but axially fixed relative to said output shaft;
   a lock-up clutch plate disposed between said first input shell and said turbine runner and axially movable relative to said output shaft for engagement with and disengagement from said first input shell, said lock-up clutch plate being rotationally fixed relative to said output shaft so that during engagement with said first input shell it directly drivingly connects said first input shell to said output shaft;
   first clutch means for engaging said lock-up clutch plate with said turbine runner during disengagement of said lock-up clutch plate from said first input shell; and
   second clutch means disposed between said mating end portions of said input shells and said lock-up clutch plate for engaging said input shells while allowing rotation of said input shells relative to said lock-up clutch plate during disengagement of said lock-up clutch plate from said first input shell and disengaging said input shells during engagement of said lock-up clutch plate with said first input shell.

2. A hydraulic torque transmitting device according to claim 1, wherein said second clutch means comprises a synchromesh gear clutch having first and second sets of internal gear teeth respectively installed in said mating portions of said first and second input shells and a third set of external gear teeth installed in said lock-up clutch plate, said third set of gear teeth being engaged with both said first and second sets of gear teeth during disengagement of said lock-up clutch plate from said first input shell and engaged with only said first set of gear teeth during engagement of said lock-up clutch plate with said first input shell.

3. A hydraulic torque transmitting device according to claim 2, wherein said second clutch means further comprises a bearing by way of which said third set of gear teeth is installed on said lock-up clutch plate.

4. A hydraulic torque transmitting device according to claim 3, wherein said bearing comprises an inner ring secured to said lock-up clutch plate and an outer ring on which said third set of gear teeth is installed.

5. A hydraulic torque transmitting device according to claim 3, wherein said mating end portion of said second input shell comprises an inward projection, and said second clutch means further comprises a synchro ring axially movably installed on said outer ring of said bearing, and a synchro spring for urging said synchro ring into contact with said inward projection of said second input shell, said inward projection of said second shell, said synchro ring and said synchro spring constituting synchromesh means for synchronizing rotations of said first and second input shells prior to engagement of said third set of gear teeth with said second set of gear teeth.

6. A hydraulic torque transmitting device according to claim 1, wherein said first clutch means comprises a gear clutch having gear teeth formed in said lock-up clutch plate and gear teeth formed in said turbine runner.

7. A hydraulic torque transmitting device according to claim 6, further comprising first seal means for sealing said mating end portions of said first and second input shells, and second seal means for providing a seal between said inward projection of said second input shell and said lock-up clutch plate prior to engagement of said lock-up clutch plate with said input shell and thereby preventing said first seal means from being subjected to an otherwise resulting hydraulic pressure.

8. A hydraulic torque transmitting device according to claim 7, wherein said first seal means comprises a labyrinth seal and a groove defined between said mating end portions of said first and second input shells for receiving therein said labyrinth seal.

9. A hydraulic torque transmitting device according to claim 8, further comprising a stator in toroidal fluid flow relation with said pump impeller and said turbine runner.

* * * * *